United States Patent
Harris

(10) Patent No.: US 6,535,582 B1
(45) Date of Patent: Mar. 18, 2003

(54) VOICE VERIFICATION SYSTEM

(75) Inventor: Vance Harris, Dublin (IE)

(73) Assignee: Buy-Tel Innovations Limited, Dublin (IE)

( * ) Notice: Subject to any disclaimer, the term of this patent is extended or adjusted under 35 U.S.C. 154(b) by 179 days.

(21) Appl. No.: 09/676,470

(22) Filed: Oct. 2, 2000

(30) Foreign Application Priority Data

Sep. 30, 1999 (IE) .................................................. 990812

(51) Int. Cl.[7] .......................... H04M 1/64; H04M 1/56; H04M 7/00
(52) U.S. Cl. ................. 379/88.01; 379/88.02; 379/88.03; 379/88.07; 379/142.05; 379/221.02; 379/221.07
(58) Field of Search .......................... 379/88.01, 88.02, 379/88.03, 88.04, 88.05, 88.06, 88.07, 88.08, 201.02, 201.08, 201.11, 142.05, 144.06, 221.02, 221.03, 221.04, 221.07

(56) References Cited

U.S. PATENT DOCUMENTS

| | | | | |
|---|---|---|---|---|
| 5,325,421 A | * | 6/1994 | Hou et al. ..................... | 379/67 |
| 5,499,288 A | | 3/1996 | Hunt et al. .................... | 379/88 |
| 6,101,473 A | * | 8/2000 | Scott et al. ................... | 704/275 |
| 6,161,090 A | * | 12/2000 | Kanevsky et al. ........... | 704/246 |
| 6,275,806 B1 | * | 8/2001 | Pertrushin .................... | 704/272 |
| 6,335,927 B1 | * | 1/2002 | Ellliott et al. ................ | 370/352 |

FOREIGN PATENT DOCUMENTS

EP   1005002 A1   5/2000

* cited by examiner

Primary Examiner—Allan Hoosain
(74) Attorney, Agent, or Firm—Jacobson Holman PLLC

(57) ABSTRACT

A voice verification system (1) has a verification server layer (55) providing centralized verification for multiple service providers in geographically spread locations. Each service provider has an IVR (41) using a C++ DLL API (43) to communicate with a verification server (56, 57) via ISPs (45) and a switching system (50). Each API (43) dynamically determines an optimum ISP/server socket to minimize a verification cycle time. The switching system (50) has a router and two-stage switch combination with firewalls to provide optimum resilience in paths to the server (56, 57).

14 Claims, 3 Drawing Sheets

VOICE VERIFICATION SYSTEM

FIELD OF THE INVENTION

The invention relates to provision of transaction processing facilities using voice verification as a means of enabling a caller to gain access to carry out a transaction.

PRIOR ART DISCUSSION

There has been rapid growth in "e-commerce" in recent years, in which Web browsers communicate with Web servers using HTML to perform a transaction such as purchasing a consumer product. However one of the major problems being addressed in development of this technology is that of providing adequate security for consumer data such as credit card numbers. Another problem is that of delays in gaining access to servers and having the transaction processed, because of limited telecommunication bandwidth and high traffic volume.

In parallel with these developments, systems for online transaction processing using voice as the communication medium have been developed. An example is the system described in our European Patent Specification No. EP 1 005 002 A1. Another example is described in U.S. Pat. No. 5,499,288. Such systems do not require the user to operate a browser and indeed a conventional telephone is sufficient. Another advantage is that there is a low bandwidth requirement.

However, despite the fact that each individual transaction involves (on average) relatively little data and bandwidth, it is at times difficult for a server to handle all incoming connections. Also, failure of any link between the consumer and the voice verification server results in failure of the transaction.

The invention is therefore directed towards providing a voice verification system which provides improved fault resilience and optimum utilisation of voice verification servers and other necessary resources.

SUMMARY OF THE INVENTION

According to the invention, there is provided a voice verification system comprising a verification engine connected to an interactive voice response system (IVR) to verify callers of a hosted service, characterised in that, the verification engine is hosted on a verification server comprising means for interfacing with a plurality of IVRs to perform centralised voice verification, and each IVR is connected to an interface to the verification server.

In one embodiment, each interface comprises a Dynamic Library Linked (DLL) API.

In one embodiment, each interface comprises means for communicating with the server via s plurality of Internet Service Provider servers (ISPs).

In one embodiment, each interface comprises means for maintaining a communication socket for each ISP/verification server link, and means for dynamically choosing a preferred socket in real time for each verification operation.

In one embodiment, the system comprises a plurality of verification servers and each interface comprises means for maintaining a socket for each ISP/verification server combination.

In one embodiment, each interface comprises means for transmitting a polling signal on each socket to request a verification time indicator.

In one embodiment, each verification server comprises means for responding to a polling signal with queue time value.

In one embodiment, each interface comprises means for automatically monitoring polling signal response time, and for adding each response time to the associated queue time value to determine a current verification cycle time.

In one embodiment, each interface comprises means for dynamically choosing an available socket having a lowest current verification cycle time.

In one embodiment, each interface comprises means for determining the current verification cycle time for each socket in a background process activated at configurable time periods and in parallel with verification communication.

In one embodiment, the system further comprises a switching system connected between the ISPs and the verification servers.

In one embodiment, the switching system comprises a router associated with each ISP.

In one embodiment, each router is connected to a plurality of switches between the routers and the verification servers.

In one embodiment, each switch has a single output, and said output is connected to a firewall, and an output of each firewall is connected to a switch in a second switch stage.

In one embodiment, each switch in said second switch stage is connected to a plurality of verification servers.

According to another aspect, the invention provides a voice verification system comprising:

an interactive voice response (IVR) layer comprising IVR applications at remote locations;

an API layer comprising APIs for the IVR applications;

a plurality of Internet Service Provider (ISP) servers registered with the APIs;

a switching system comprising a router associated with each registered ISP server;

a verification server layer comprising a plurality of verification servers connected to the switching system, wherein each API comprises means for maintaining a socket for each ISP/verification server combination, for polling each verification server in a background polling process, for receiving a response from each verification server indicating current verification queue time, and for dynamically choosing a socket for a voice verification operation according to said queue time.

In one embodiment, each API comprises means for monitoring polling signal response time, for adding the response time to said verification queue time to determine a verification cycle time, and for dynamically choosing a socket having the lowest current verification cycle time.

In one embodiment, the switching system comprises, between the routers and the verification servers:

a first stage of switches in which each router is connected to a plurality of said first stages switches;

a firewall connected to an output of each first stage switch; and a second stage of switches each connected to an output of each firewall, and in which each said second stage switch is connected to a plurality of verification servers.

DETAILED DESCRIPTION OF THE INVENTION

The invention will be more clearly understood from the following description of some embodiments thereof, given by way of example only with reference to the accompanying drawings in which.

Figure 1:
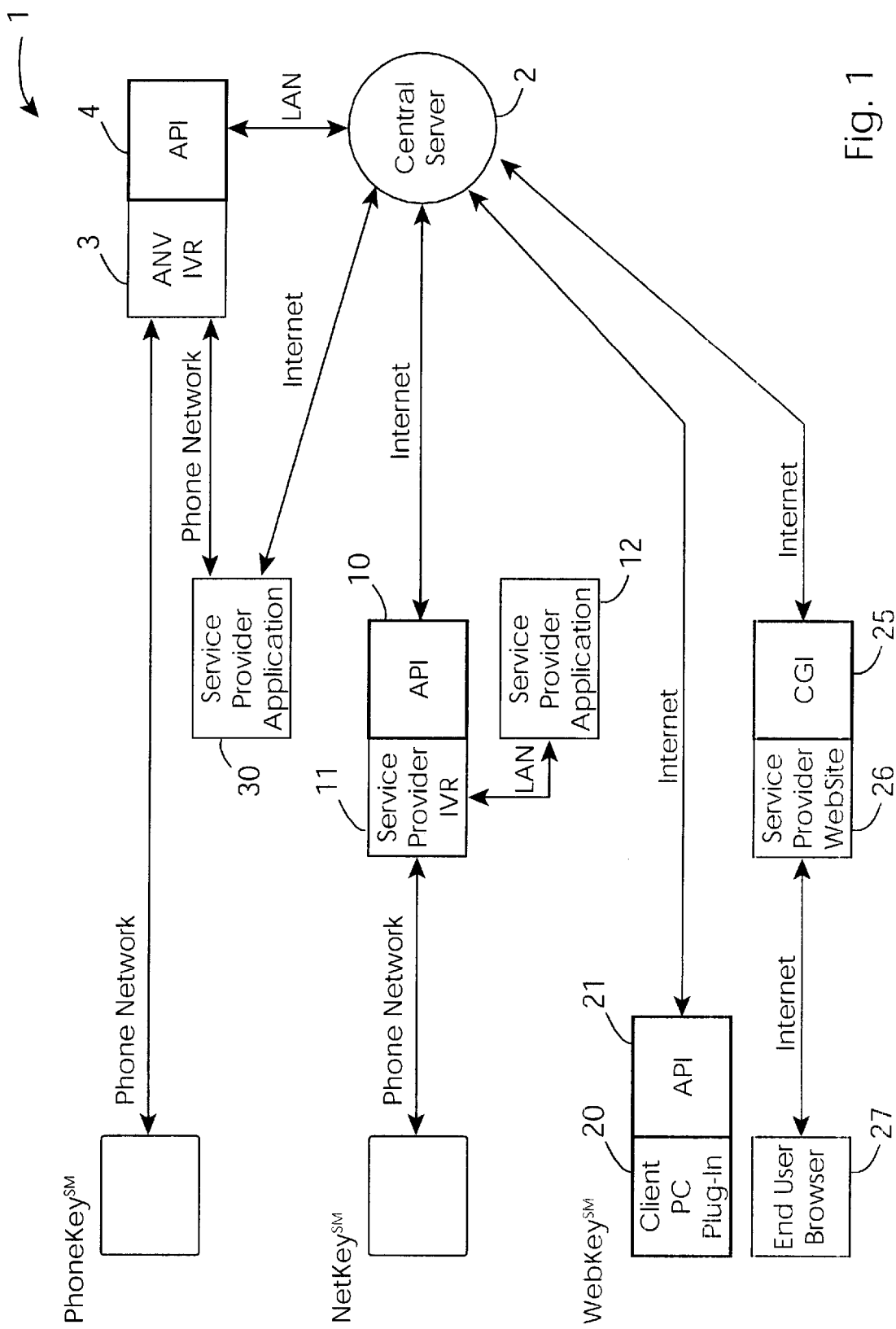
FIG. 1 is a diagram illustrating forms of communication available for transaction processing.

Referring to FIG. 1, a voice verification system 1 comprises a central server 2 which performs the core voice verification operations. The system also comprises an interactive voice response system (IVR) 3 which performs speech recognition, and an associated API 4 for provision of both IVR and verification services. This general service is termed "PhoneKey". Another service, "NetKey" comprises an API 10 for a service provider IVR 11 linked to an ISP application 12. Finally, a "WebKey" service is provided by a client PC 20 having an API 21 for the server 2. Also, a common gateway interface CGI 25 allows the server 2 to interface with a service provider Web site 26 for communication with an end user browser 27.

In operation, service providers use the server 2 to authenticate end users (clients/subscribers) before connecting them to information and/or services provided by operators. This reduces user access time to the service provider's system and increases overall productivity of the service provider's system.

The end user starts with either a toll-free phone call or by accessing a designated Internet site. Phone calls are answered with a customised screen display.

The end user is then asked to provide a verbal input, via either a phone handset or computer microphone. Account Number Verification (ANV) as used by the IVR 3 in response to the user speaking his account number. Alternatively, the verbal input can be repetition of digits or phrases. For the ANV method, the IVR requests the user to enter his/her account number via verbal input, phone keypad, or computer keyboard. The central server 2 then retrieves the voice print for the account number entered. Next, the verification engine in the central server 2 completes the identification of the user, by comparing the user's voice sample with the reference voiceprint for the designated account number. If there is a voice match, the service provider's system is notified and the appropriate actions are taken, for example, the user is connected to a customer service representative (CSR) or input data is taken from the user.

If the voices do not match, the user is either asked to try again or is denied access to the service provider's system. At the option of the service provider, users whose voices do not match can be switched to an operator for further action.

In addition to confirming user identity, service provider systems may offer spoken menu selection choices which are sent to the service provider with confirmation of user identity.

As is clear from FIG. 1, the system 1 allows for comprehensive and versatile transaction processing in which a core feature is verification of the user (usually customer) by way of voice verification operations of the central server 2. Service providers (such as a merchant) host an IVR, and an API to the central server 2. The user may use his or her telephone to perform the transaction or alternatively a browser if visual images are required or advantageous. Indeed, it is not essential that the IVR operations be hosted by the service provider. For example, in this embodiment the organisation hosting the central server 2 also hosts the IVR 3 and the API 4 for the PhoneKey™ service. The IVR 3 links with a service provider application 30 to provide the required recognition and verification data for the service provider to host the relevant service. This versatility is very important in today's fast-changing marketplace. In the Netkey service, the service provider hosts the IVR 11 and it is linked to the application 12 via a local area network.

Regarding the hardware configuration, the central server 2 is a triply redundant system (plus additional redundancy in some areas) with:

HP fibre channel RAID for voiceprint storage, multiple 8-way Zeon processors, and redundant enhanced recognition and verification software, database software and other system software.

The central server 2 comprises a number of individual independent, interconnected, mirrored servers, located in different physical locations for maximum operational integrity. External communications (all locations) include multiple telephone carriers and Internet gateways, utilising multiple, redundant 100 Mbps copper, fibre-optic, optic, and microwave services. The capacity of each individual server (expandable) provides:

8 GigaBytes of main memory, storage for 64 million voiceprints (−10 Kbytes each), and 0.5 second processing time per end-user verification.

The central server 2 can accept voice information over the phone network, a local area, network, or the Internet and can respond, via either phone network or the Internet with:

end-user account information, end-user identity verification decisions and other information, end-user caller ID information, data capture (customer menu choices and/or other information, as appropriate), call forwarding of original end-user phone call (if appropriate), and real-time and archival reports of transaction data and system decisions.

Figure 2:
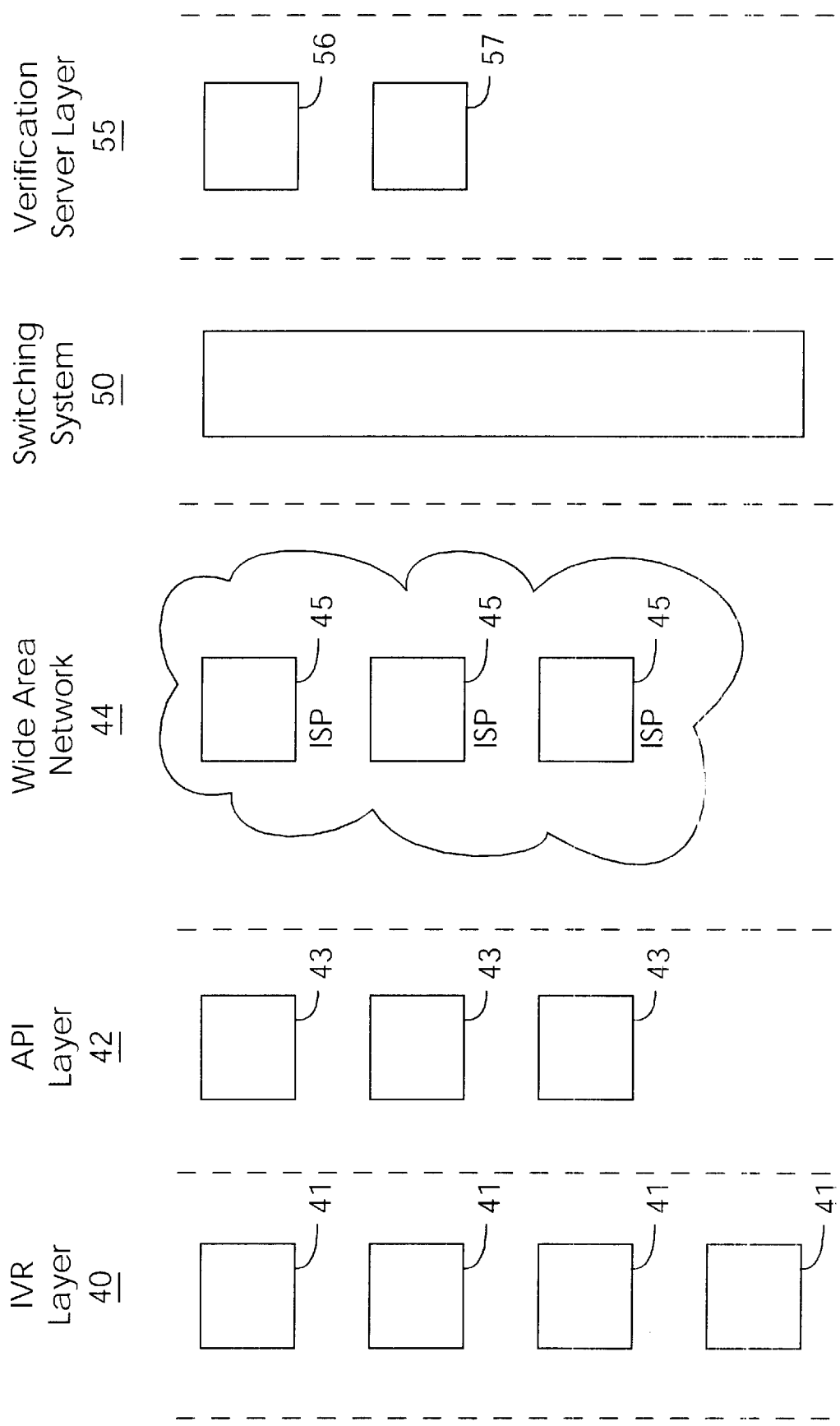
FIG. 2 is a high level schematic representation of a voice verification system.

Referring now to FIG. 2 a generalised architecture for the various services is illustrated. The layers which are illustrated in FIG. 2 set out the systems which interact between the service provider and the central server 2. There is an IVR layer 40 having IVR applications 41. An API layer 42 has APIs 43. A wide area network layer 44 is in this case the Internet in which various Internet service providers (ISP) 45 are used. Finally, there is a switching system 50, and a verification server layer 55 (central server 2) has individual servers 56 and 57. The number of machines within each layer is configurable depending on the extent of services being provided and on the number of users.

Within the architecture of FIG. 2, each API 43 has a socket for each address. There is one address for each combination of ISP 45 and a verification server 56 or 57. Thus, for example, if there are four ISPs and four servers, there will be sixteen sockets in each API 43.

Each API 43 is programmed to place one byte on each socket to query the load of the verification servers 56 and 57. This byte is transmitted in a signal via the network layer 44 and the switching system 50. If a return takes greater than 10 seconds the API 43 proceeds to the next socket. The return information provides both the latency of each socket and queue time and the API 43 uses the socket which provides the shortest site or time.

Figure 3:
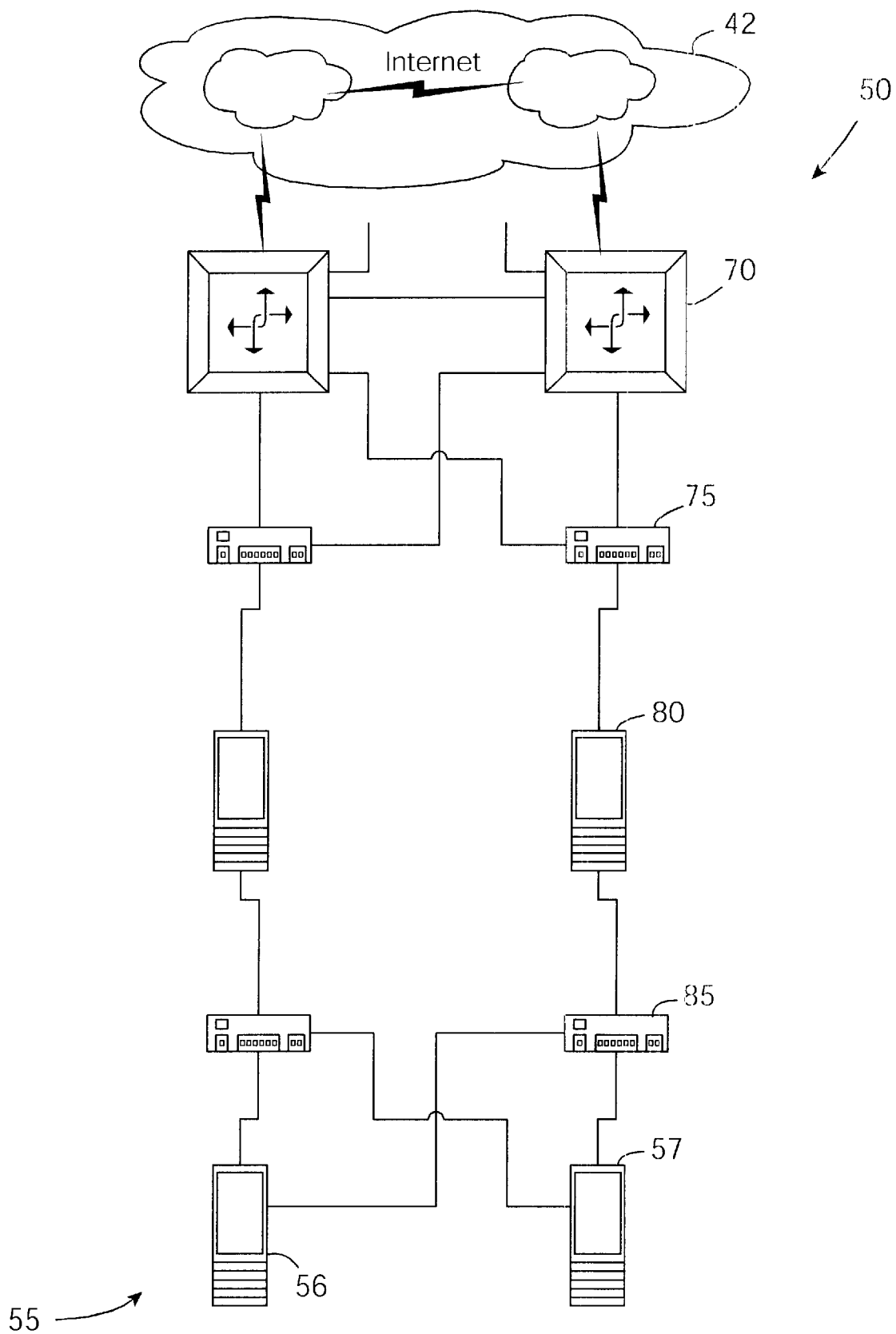
FIG. 3 is a more detailed diagram of the system.

Referring now to FIG. 3, the switching system 50 comprises two routers 70, two switches 75, two firewalls 80, and two switches 85. Each router 70 is a Cisco 7200™ router, and there is one router 70 per ISP physical connection. Each router 70 is connected by a twisted pair cable to each of two Cisco Vland Management™ switches 75. Thus, each switch 75 has two input links, and there is one output link to a firewall 80. Each firewall 80 allows only a single client to access a single server output link. Only known addresses are allowed access. Additional resilience is provided by the switches 85, each registered on the external interface of an associated firewall 80. Each switch 85 has an output to each of the two servers 56 and 57. The switching system 50 provides excellent resilience and security. While each firewall 80 has only one registered input and one registered output, the routers 70, the switches 75, and the switches 85 provide alternative paths in the event of failure of any one device. It has also been found that this arrangement achieves excellent performance because of the manner in which the load is distributed.

The overall architecture shown in FIG. 2 allows versatile combinations. The APIs 43 need not be co-located with the IVRs 41. Thus, the IVRs 41, the APIs 43, the ISPs 45, and the servers 56 and 57 can be located at any desired location. The linkage may be regarded as a capture (C)—process (P)—verify (V) sequence, in which the interaction may be C:P:V,
C/P:V,
C:P/V, or
C/P/Y, in which ":" indicates that stages are remote and "/" indicates co-located. The IVRs 41 capture, the APIs 43 process, and the servers 56, 57 verify. The switching system 50 is co-located with the servers 56 and 57 for bandwidth, security, and maintenance reasons. The physical separation of the APIs 43 is made possible by virtue of the fact that they are C++ programs Dynamic Library Linked (DLL) for modularity.

As stated above, each API 43 has a socket for every ISP-server combination. They dynamically route processing and verification requests to the ISP-server socket providing the fastest response. This is achieved by a background process polling the servers 56 and 57 in sequence via the different sockets. The polling signal takes the form of only a single byte. The APIs 43 wait ten seconds for a response, and if no response is received in this time it registers the socket as temporarily offline and discontinues use of it. Each server 56 and 57 returns a signal indicating the current verification queue time, in response to a polling signal.

Responses are processed by the API 43 automatically determining the response time for the polling signal and adding this value to the queue time returned by the server 56 or 57 to determine a verification cycle time. This time value is used to prioritise sockets dynamically, the socket having the lowest value at any time being chosen for a verification operation.

It will be appreciated that the invention allows excellent versatility and resilience in the capture-process-verify cycle for service providers at a large number of geographically spread locations. The range of possible applications supported is very wide, and the following table sets out some examples.

| Application | Comments | Phone Key | Net Key | Web Key |
|---|---|---|---|---|
| Electronic Commerce | Confirm that the customer is authorized to user the account selected | X | X | X |
| On Line Financial Services | Confirm that the caller is the actual owner of the account | X | X | X |
| Proprietary, Confidential, and Subscriber Websites | Confirm that the caller is the actual owner of the account | | | X |
| Toll Call and Cellular Service | Confirm that the caller is the valid account holder | X | X | |
| Long Distance Conferencing, International Callback, Phone Cards | Confirm that the caller is the valid account holder | X | X | |
| Telephone and Internet Purchasing | Confirm that the user is authorized to purchase goods and services | X | X | X |
| Telecommuters | Confirm that the caller is the actual employee | X | X | X |
| On Line Learning | Confirm that the registered student is the person taking an exam | X | X | X |
| Home Health Care | Confirm that the actual health care provider is at their assigned location | X | X | X |
| Offender Tracking | Confirm that the parolee/probationer is at the location assigned by the court | X | X | |
| On Line Unemployment Insurance | Confirm location and identity of the person requesting benefits | X | X | X |
| On Line Welfare Benefits | Confirm location and identity of the person requesting benefits | X | X | X |

The invention is not limited to the embodiments described but may be varied in construction and detail.

What is claimed is:

1. A voice verification system comprising a verification engine connected to an interactive voice response system to verify callers of a hosted service, the verification engine is hosted on a verification server including means for interfacing with a plurality of IVRs to perform centralized voice verification, each said IVR is connected to an interface to the verification server, each said interface includes means for communicating with the server through a plurality of Internet Service Provider servers (ISPs), and each said interface includes means for maintaining a communication socket for each ISP/verification server link, and means for dynamically choosing a preferred socket in real time for each verification operation.

2. The system as claimed in claim 1, wherein each said interface comprises a Dynamic Library Linked (DLL) API.

3. The system as claimed in claim 1, wherein the system comprises a plurality of verification servers and each said interface comprises means for maintaining a socket for each ISP/verification server combination.

4. A voice verification system comprising a verification engine connected to an interactive voice response system to verify callers of a hosted service, the verification engine is hosted on a verification server including means for interfacing with a plurality of IVRs to perform centralized voice verification, each said IVR is connected to an interface to the verification server, and each said interface includes means for transmitting a polling signal on each socket to request a verification time indicator.

5. The system as claimed in claim 4, wherein each verification server comprises means for responding to a polling signal with queue time value.

6. The system as claimed in claim 5, wherein each interface comprises means for automatically monitoring polling signal response time, and for adding each response time to the associate queue time value to determine a current verification cycle time.

7. The system as claimed in claim 6, wherein each interface comprises means for dynamically choosing an available socket having a lowest current verification cycle time.

8. The system as claimed in claim 4, wherein each interface comprises means for determining the current verification cycle time for each socket in a background process activated at configurable time periods and in parallel with verification communication.

9. A voice verification system comprising a verification engine connected to an interactive voice response system to verify callers of a hosted service, the verification engine is hosted on a verification server including means for interfacing with a plurality of IVRs to perform centralized voice verification, each said IVR is connected to an interface to the verification server, a switching system is connected between the ISPs and the verification servers, said switching system includes a router associated with each ISP, and each said router is connected to a plurality of switches between the routers and the verification servers.

10. The system as claimed in claim 9, wherein each said switch has a single output, and said output is connected to a firewall, and an output of each firewall is connected to a switch in a second switch stage.

11. The system as claimed in claim 10, wherein each said switch in said second switch stage is connected to a plurality of verification servers.

12. A voice verification system comprising:

an interactive voice response (IVR) layer including IVR applications at remote locations;

an API layer including APIs for the IVR applications;

a plurality of Internet Server Provider (ISP) servers registered with the APIs;

a switching system including a router associated with each registered ISP server;

a verification server layer including a plurality of verification servers connected to the switching system, wherein each API includes means for maintaining a socket for each ISP/verification server combination, for polling each verification server in a background polling process, for receiving a response from each verification server indicating current verification queue time, and for dynamically choosing a socket for a voice verification operation according to said queue time.

13. The system as claimed in claim 12, wherein each API comprises means for monitoring polling signal response time, for adding the response time to said verification queue time to determine a verification cycle time, and for dynamically choosing a cycle having the lowest current verification cycle time.

14. The system as claimed in claim 12, wherein the switching system comprises, between the routers and the verification servers:

a first stage of switches in which each router is connected to a plurality of said first stage switches;

a firewall connected to an output of each first stage switch; and a second stage of switches each connected to an output of each firewall, and in which each said second stage switch is connected to a plurality of verification servers.

* * * * *